United States Patent [19]

Jones

[11] Patent Number: 4,883,952
[45] Date of Patent: Nov. 28, 1989

[54] OPTICAL BIREFRINGMENT PARAMETER MEASURING SENSOR

[76] Inventor: Gordon R. Jones, 17 Brimstage Close, Heswall, Merseyside, England

[21] Appl. No.: 168,449

[22] Filed: Mar. 15, 1988

[30] Foreign Application Priority Data

Mar. 17, 1987 [GB] United Kingdom ............... 8706318

[51] Int. Cl.$^4$ .............................................. G02F 1/01
[52] U.S. Cl. ................................... 250/225; 250/226; 250/227; 250/231 P
[58] Field of Search ............................ 250/225–227, 250/231 P; 356/405–407, 33–36; 73/705

[56] References Cited

U.S. PATENT DOCUMENTS

| | | | |
|---|---|---|---|
| 1,934,187 | 11/1933 | Glasgow et al. | 356/33 |
| 3,069,973 | 12/1962 | Ames | 250/225 |
| 3,811,775 | 5/1974 | Abu-Saud | 356/34 |
| 3,963,348 | 6/1976 | Nakatani et al. | 356/33 |
| 4,171,908 | 10/1979 | Robert et al. | 356/33 |
| 4,247,202 | 1/1981 | Failes | 250/226 |
| 4,517,456 | 5/1985 | Halsall et al. | 250/227 |
| 4,543,961 | 10/1985 | Brown | 250/227 |
| 4,547,074 | 10/1985 | Hinoda et al. | 356/405 |
| 4,630,040 | 12/1986 | Haertling | 350/392 |
| 4,636,078 | 1/1987 | Podvin | 350/509 |

Primary Examiner—David C. Nelms
Assistant Examiner—Stephone B. Allen
Attorney, Agent, or Firm—John S. Hale

[57] ABSTRACT

An optical sensor comprises a polychromatic light source (3), a detector (4), and first and second polarizers (7) (8) disposed in the light path between the source and the detector. The polarization axis of the first polarizer (7) is substantially orthogonal to that of the second (8), and there is a modulating element (6) of birefringent material disposed therebetween. The modulating element is disposed such that a change in the parameter to be measured alters the optical path length of the polychromatic light through the modulating element, thereby changing the color of the light incident on the detector (4). The detector comprises first and second photo-responsive elements (9) (10), the responsivity with respect to wavelength of the first element (9) being different from that of the second (10). Signals from the photo-responsive elements are fed to a microprocessor (13) which calculates the color of the light incident on the detector as represented by two or more parameters on the Chromaticity (CIE) Diagram, and interprets this color in terms of the parameter to be measured.

11 Claims, 1 Drawing Sheet

OPTICAL BIREFRINGMENT PARAMETER MEASURING SENSOR

This invention relates to the measurement of a parameter, and in particular to optical sensors utilizing that property of some materials which is known as birefringence.

In a birefringent material the refractive index is not uniform for all directions, but varies from one direction to another. A beam of natural light entering a birefringent material will be split into two rays, the ordinary and extraordinary rays, one displaced laterally of the other. Each of the two rays is polarised in a different direction.

It is known to produce optical modulators employing birefringent materials. These known modulators, such as the Faraday effect modulator, vary the plane of polarization of a beam of light in accordance with a modulating voltage or magnetic field applied to the birefringent material.

It is an object of the present invention to provide an optical sensor capable of measuring a parameter such as pressure, temperature, etc., employing a birefringent material.

Accordingly there is provided apparatus for measuring a parameter comprising a polychromatic light source; a detector, the source being adapted to propagate polychromatic light along a path to the detector; first and second polarizers longitudinally spaced one from the other in the said path and oriented such that the polarization axis of the first polarizer is substantially orthogonal to that of the second; a modulating element of birefringent material disposed in the path between the first and second polarizers such that a change in the parameter to be measured causes a change in the optical path length of the polychromatic light through the modulating element, and hence a change in the color of the light incident on the detector, the detector comprising at least first and second photo-responsive elements, the responsivity with respect to wavelength of the first element being different from that of the second; and analysis means, signals from the photo-responsive elements being fed to the analysis means which calculates, from the signals from the photo-responsive elements, the color of the polychromatic light incident on the detector as represented by two or more parameters on the Chromaticity (CIE) Diagram, the analysis means being adapted to interpret the output of the detector in terms of the parameter to be measured.

The ordinary and extraordinary rays emerging from the birefringent modulating element will interfere destructively to suppress certain wavelength components of the polychromatic light. Thus the emerging light will have a 'color signature' introduced by the birefringent material. The optical path length is the product of the refractive index of the material and the length of the path taken by the light through the material. A change in either the refractive index or the length of the path through the material will cause a change in the wavelength components which are suppressed, and hence the color of the light reaching the detector. For certain parameters, the parameter to be measured will directly affect the refractive index of the modulating element and vary the color signature of the light emerging therefrom. For example, electric and magnetic fields will modify the refractive index of the element in this way. In addition, the refractive index of a lithium niobate modulating element will vary if a voltage is applied thereto. Other known birefringent materials can also be used in similar fashion.

In one convenient arrangement two different photo-responsive elements are employed, each with its own wavelength responsivity characteristic. Alternatively, one or both of the photo-responsive elements includes a colored filter to impart a colour response characteristic, thereby allowing two identical photo-responsive elements to be employed, if desired. Preferably the responsivity with respect to wavelength of the at least first and second photo-responsive elements is such that their respective wavelength/intensity curves overlap for at least a part of the wavelength spectrum.

By employing at least first and second photo-responsive elements, a change of color is determined by assessing the change in the whole of a selected part of the spectrum (color modulation) as opposed to merely detecting the change at two or more selected wavelengths (wavelength modulation). Thus a change from color A (represented by wavelength/intensity curve A) to color B (represented by wavelength/intensity curve B) will be calculated from the area between the two curves, thereby giving a more complete analysis of 'true' color. Wavelength modulation is less sophisticated in that it is a calculation based on the distance between the curves at two or more selected wavelengths.

By the term 'polychromatic light' there is herein meant any multi-wavelength radiation, and is specifically meant to include both visible light and infra red radiation. The term 'color', whilst used herein for ease of understanding, should in no way imply that only visible light may be employed. Where the apparatus employs a source emitting radiation outside of the visible spectrum, the term 'color' will refer to the spectral distribution of the radiation.

The modulating element is preferably disposed such that a change in the parameter to be measured causes a movement of the modulating element in the said path. In one convenient arrangement a change in the parameter to be measured causes a change in the proportion of the modulating element which is in the said path. In an alternative arrangement the modulating element is disposed such that a change in the parameter to be measured causes a rotation of the modulating element about the longitudinal axis of the polychromatic light path. As in a birefringent material the refractive index is not uniform in all directions, any rotation of the modulating element will alter the refractive index of the material through which the light passes and hence the optical path length also. Alternatively the modulating element is disposed such that a change in the parameter to be measured causes a change in the length of the path taken by the polychromatic light through the modulating element. Any change in the total path length taken through the modulating element will also vary the optical path length, and hence the wavelength components which are suppressed by destructive interference, and therefore the color signature of the light reaching the detector.

Conveniently the modulating element is non-spherical and is rotatably supported in the polychromatic light path such that a change in the parameter to be measured causes a rotation of the modulating element. Rotation of the element changes the thickness of the element though which the polychromatic light has to pass in order to reach the detector, and hence the colour signature of the light. Alternatively the modulating element is such that a change in the parameter to be measured causes a change in the dimensions of the modulating element. In one convenient arrangement the modulating element is secured in the polychromatic light path such that a change in the parameter to be measured causes a deformation of the modulating element. Where the parameter to be measured is a pressure, the modulating element is conveniently in the form of a diaphragm disposed in the polychromatic light path and arranged such as to be flexed by the pressure to be measured.

Alternatively where the parameter to be measured is a temperature, the modulating element conveniently comprises a thermally sensitive body disposed in the polychromatic light path such that a change in the temperature causes an expansion or contraction of the body. As before, the change in path length through the modulating element is responsible for a change in color of the light which can be detected by the detector.

The invention further resides in a method of measuring a parameter employing apparatus as hereinbefore described. In particular, a method of measuring a parameter comprises the steps of providing a polychromatic light signal polarized at a first polarization; passing said polychromatic light signal through a modulating element of birefringent material; disposing the modulating element such that a change in the parameter to be measured causes a change in the optical path length of the polychromatic light through the modulating element, and hence a change in the color of the polychromatic light emerging from the modulating element at a second polarization; detecting the intensity of the light emerging from the modulating element at the second polarisation with a detector comprising first and second photo-responsive elements, the responsivity with respect to wavelength of the first element being different from that of the second; calculating, from the output of the first and second photo-responsive elements, the color of the polychromatic by two or more parameters on the Chromaticity (CIE) Diagram and interpreting the color of the polychromatic light incident on the detector in terms of the parameter to be measured.

The invention will now be further described, by way of example only, with reference to the accompanying drawings in which.

Figure 1:
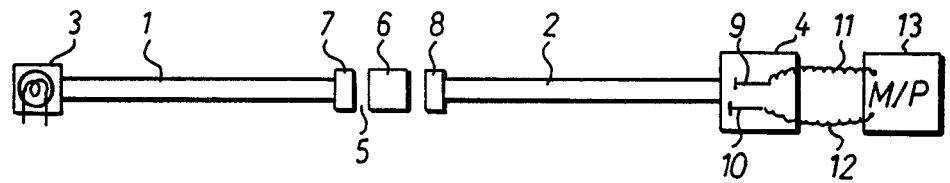
FIG. 1 is a schematic diagram of apparatus according to the invention.

Referring to FIG. 1 there is shown a sensor comprising two aligned optical fibers 1 and 2 transmitting polychromatic light from a source 3 to a detector 4. An air gap 5 exists between the two aligned fibers 1 and 2, in which gap is provided body 6 of birefringent material. A pair of crossed polarizers 7 and 8 are present in the air gap, one adjacent each of the fibers 1 and 2. Conceivably the polarizers 7 and 8 are attached, e.g. by a transparent adhesive, one to each of the optical fibers 1 and 2.

Polychromatic light, polarised by the polariser 7, traverses the birefringent body 6 producing ordinary and extraordinary rays which interfere destructively at certain wavelengths. The resulting beam transmitted by the fiber 2 will therefore be polychromatic light with certain wavelengths components suppressed, thereby giving a distinctive color to the light reaching the detector 4. A change in the parameter to be measured, such as for example temperature or magnetic field, alters the optical path length of the polychromatic light passing through the body 6, causing different wavelength components to be suppressed, and hence a different color signature to be imposed on the light reaching the detector 4.

The detector 4 comprises two photo-responsive element 9 and 10, signals from which are passed via lines 11 and 12 to a microprocessor 13 for analysis. The microprocessor 13 calculates the color of the detected light in terms of two parameters on the Chromaticity (CIE) Diagram from the signals from the photo-responsive elements 9 and 10. The microprocessor, on detecting a change in color, may give an indication that a change in the parameter has been detected, for example on a display unit (not shown).

Figure 2:
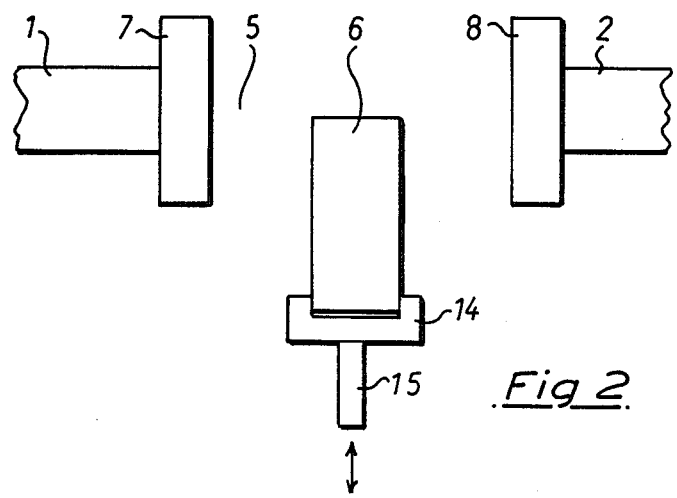
FIG. 2 is a schematic diagram of a modulating element according to an alternative embodiment of the invention.

FIG. 2 shows an alternative embodiment in which the parameter to be measured, for example pressure, movement, etc., is translated into a lateral displacement of the birefringent body 6 in the air gap 5. The body is mounted on a support 14, secured to a shaft 15 for movement caused by the parameter to be measured. Movement of the shaft 15 changes the proportion of the light which passes through the birefringent body 6 and hence the color of the light transmitted by the fibre 2. The color change is detected as described above and employed to give an indication of the parameter to be measured.

Figure 3:
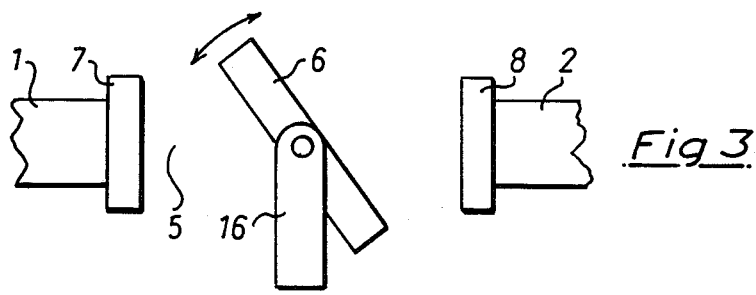
FIG. 3 is a schematic diagram of a modulating element according to another alternative embodiment of the invention.

In the embodiment of FIG. 3 the birefringent body 6 is rotatably mounted on a cradle 16. The parameter to be measured rotates the body 6 thereby changing the path length of the polychromatic light therethrough. As the suppression of wavelength components is caused by the wavelengths which will be suppressed. Thus the rotation of the body 6 causes a corresponding change in the color of the light transmitted by the fiber 2, which is detected as previously described.

Figure 4:
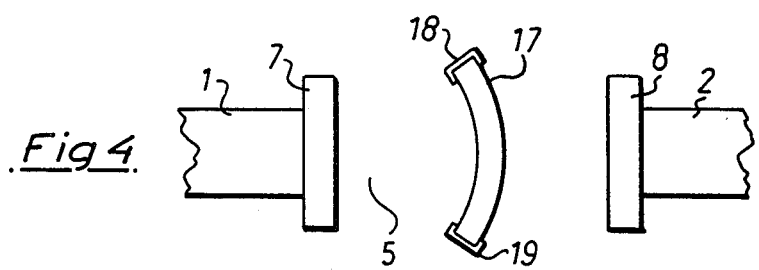
FIG. 4 is a schematic diagram of a modulating element according to a further alternative embodiment of the invention.

FIG. 4 shows the birefringent body in the form of a diaphragm 17, secured between rigidly mounted supports 18 and 19. The parameter to be measured, in this case a pressure, causes a deformation of the diaphragm 17, varying the path length of the light therethrough. As previously described, this causes a change in color of the light transmitted by the fiber 2, which can be detected to give an indication of the pressure causing the deformation of the diaphragm 17.

It will be appreciated that other arrangements can be envisaged to give a change in the path length of the light passing through a birefringent body. For example, the thermal expansion of a birefringent body can be employed to give a change in path length. A simple temperature sensor can easily be constructed in this way. Alternatively the body 6 can be arranged to be rotated about the axis of the fibers 1 and 2, thereby to alter the refractive index of the material presented to the light beam. It will also be understood that although only transmissive mode sensors have been illustrated herein, reflective mode alternatives could be easily constructed.

I claim:

1. Apparatus for measuring a parameter comprising a polychromatic light source; a detector disposed such that polychromatic light is propagated along a path from the source to the detector, the detector comprising at least first and second photo-responsive elements, the responsivity with respect to wavelengths of the first element being different from that of the second; first and second polarizers longitudinally spaced one from the other in the said path and oriented such that the polarization axis of the first polarizer is substantially orthogonal to that of the second; a modulating element of birefringent material disposed in the path between the first and second polarizers such that a change in the parameter to be measured causes a change in the optical path length of the polychromatic light through the modulating element, and hence a change in the color of the light incident on the detector; analysis means for calculating the color of the polychromatic light incident on the detector as represented by two or more parameters on the Chromaticity (CIE) Diagram, and means for supplying signals from the photo-responsive elements to the analysis means.

2. Apparatus according to claim 1 wherein the modulating element is disposed such that a change in the parameter to be measured causes a movement of the modulating element in the said path.

3. Apparatus according to claim 2 wherein the modulating element is disposed such that a change in the parameter to be measured causes a change in the proportion of the modulating element which is in the said path.

4. Apparatus according to claim 2 wherein the modulating element is disposed such that a change in the parameter to be measured causes a rotation of the modulating element about the longitudinal axis of the polychromatic light path.

5. Apparatus according to claim 2 wherein the modulating element is disposed such that a change in the parameter to be measured causes a change in the length of the path taken by the polychromatic light through the modulating element.

6. Apparatus according to claim 5 wherein the modulating element is non-spherical and is rotatably supported in the polychromatic light path such that a change in the parameter to be measured causes a rotation of the modulating element.

7. Apparatus according to claim 5 wherein the modulating element is such that a change in the parameter to be measured causes a change in the dimensions of the modulating element.

8. Apparatus according to claim 7 wherein the parameter to be measured is temperature, and the modulating element comprises a thermally sensitive body disposed in the polychromatic light path such that a change in the temperature causes an expansion or contraction of the body.

9. Apparatus according to claim 7 wherein the modulating element is secured in the polychromatic light path such that a change in the parameter to be measured causes a deformation of the modulating element.

10. Apparatus according to claim 9 wherein the parameter to be measured is a pressure, and the modulating element is in the form of a diaphragm disposed in the polychromatic light path and arranged such as to be flexed by the pressure to be measured.

11. A method of measuring a parameter comprising the steps of providing a polychromatic light signal polarized at a first polarization; passing said polychromatic light signal through a modulating element such that a change in the optical path length of the polychromatic light through the modulating element, and hence a change in the color of the polychromatic light emerging from the modulating element at a second polarization; detecting the intensity of the light emerging from the modulating element at the second polarisation with a detector comprising first and second photo-responsive elements, the responsivity with respect to wavelength of the first element being different from that of the second; calculating, from the output of the first and second photo-responsive elements, the color of the merging polychromatic light as represented by two or more parameters on the Chromaticity (CIE) Diagram, and interpreting the color of the emerging polychromatic light in terms of the parameter to be measured.

* * * * *